United States Patent [19]  [11] 4,401,474
Donley  [45] Aug. 30, 1983

[54] PYROLYTIC COATING REACTANT FOR DEFECT AND DURABILITY CONTROL

[75] Inventor: Harold E. Donley, Oakmont, Pa.

[73] Assignee: PPG Industries, Inc., Pittsburgh, Pa.

[21] Appl. No.: 262,285

[22] Filed: May 11, 1981

Related U.S. Application Data

[62] Division of Ser. No. 99,459, Dec. 3, 1979, Pat. No. 4,292,347.

[51] Int. Cl.$^3$ .................. B05D 3/02; C08L 91/00; C09K 3/00
[52] U.S. Cl. .................. 106/243; 427/226; 427/110; 106/287.18; 106/287.19
[58] Field of Search .................. 427/226; 106/287.24, 106/287.19, 287.18, 243

[56] References Cited

U.S. PATENT DOCUMENTS

| | | | |
|---|---|---|---|
| 3,185,586 | 5/1965 | Saunders et al. | 117/54 |
| 3,202,054 | 8/1965 | Mochel | 88/106 |
| 3,658,568 | 4/1968 | Donley | 117/46 |
| 3,660,061 | 5/1972 | Donley et al. | 65/32 |
| 4,147,556 | 4/1979 | Donley | 106/287.18 |
| 4,259,371 | 3/1981 | Postupack | 427/226 |
| 4,268,539 | 5/1981 | Nakayama et al. | 106/287.19 |
| 4,292,347 | 9/1981 | Donley | 427/110 |

Primary Examiner—Theodore Morris
Attorney, Agent, or Firm—Donna L. Seidel

[57] ABSTRACT

A mixture of carboxylate and diketonate coating reactants is disclosed to form a metal oxide film with essentially the same reflectance and transmittance properties as a metal oxide film formed from diketonate coating reactants alone, while providing improvement in the control of defects in the film.

10 Claims, No Drawings

PYROLYTIC COATING REACTANT FOR DEFECT AND DURABILITY CONTROL

CROSS-REFERENCE TO RELATED APPLICATION

This application is a division of U.S. Ser. No. 099,459 filed Dec. 3, 1979 by the same inventor, now U.S. Pat. No. 4,292,347.

FIELD OF THE INVENTION

The present invention relates generally to the art of pyrolytic deposition of metal oxide films and particularly to the deposition of such films onto a float glass surface from nonflammable solutions of organometallic coating reactants.

THE PRIOR ART

The pyrolytic deposition of transparent colored metal oxide film on glass is well-known. Such films are typically formed by contacting a hot glass surface in an oxidizing atmosphere with an aqueous solution of organometallic coating reactants. Preferred organometallic compounds include transition metal 2-ethyl hexanoates as disclosed in U.S. Pat. No. 3,185,586, transition metal 1,3-beta diketonates as disclosed in U.S. Pat. No. 3,202,054 and metal carboxylates containing quaternary alpha carbon atoms as taught in U.S. Pat. No. 3,658,568. Various organic solvents such as benzene, methanol and trichloroethane are disclosed as useful.

In the float glass environment, it is generally preferred to apply the organometallic coating solution to the glass surface just after it has been formed, while the temperature is about 1100° F. (about 593° C.). In this environment, the organic solvents used evaporate rapidly and the organometallic coating material may contact the glass nonuniformly resulting in nonuniformity in the texture of the metal oxide film.

In U.S. Pat. No. 4,147,556, Donley discloses the improvement of adding a phenolic compound such as cresol to organic solutions of diketonate coating reactants for the pyrolytic deposition of metal oxide films.

SUMMARY OF THE INVENTION

The present invention provides improvement in the control of defects in pyrolytically deposited metal oxide films without utilizing any additive in the coating solution. It has been discovered that employing a metal carboxylate coating reactant in conjunction with a metal diketonate coating reactant produces a metal oxide coating with essentially the same reflectance and transmittance properties as a metal oxide film formed from diketonate coating reactants alone while providing improvement in the control of defects.

The metal carboxylate is believed to act as a tackifier, promoting uniform adherence of the coating reactants to the glass surface upon evaporation of the solvent, thereby providing a uniform durable film upon thermal decomposition of the organometallic reactants to metal oxide. In addition, this tackifying effect promotes adherence of coating reactant which does not reach the glass surface onto whatever surface it contacts thereby reducing defects caused by waste particles dropping onto the freshly coated surface.

DESCRIPTION OF THE PREFERRED EMBODIMENTS

In a typical float glass operation, a continuous glass ribbon is drawn along the surface of a bath of molten metal. The bath is usually tin or tin-containing alloy in a reducing atmosphere. The bath is maintained at an elevated temperature so that the glass ribbon in contact therewith is sufficiently soft to flow. The temperature of the bath is progressively decreased along the direction of ribbon movement to permit the ribbon to harden and form. The hardened glass is removed from the end of the bath and conveyed through an annealing lehr on conventional conveyor rolls. A typical process for making float glass is described in U.S. Pat. No. 3,083,551.

The coating composition of the invention is applied at a coating station which is located between the end of the molten metal bath and the beginning of the annealing lehr. At this location, conditions are excellent for pyrolytically depositing a metal oxide coating. The temperature of the glass is about 1100° F. (about 593° C.) at this point, and there is sufficient oxygen in the surrounding air to insure the formation of metal oxide. The coating can be applied by a method such as disclosed in U.S. Pat. No. 3,660,061, which disclosure is incorporated herein by reference. A spray is applied from a spray gun at a rapid velocity toward the glass ribbon, traversing a relatively short distance en route to the ribbon so as to have the coating composition contact the glass uniformly. Preferably, the distance from the spray gun to the ribbon surface is on the order of about one foot (about 0.3 meter) or less. The coating composition of the present invention may be stored under pressure in an enclosed system and delivered to spray guns in conduits insulated from the hot environment of the coating station. The spray guns may be packed in thermal insulation to maintain the metal concentration at the desired level until the spray is emitted from each spray gun.

The organometallic coating reactant of the present invention comprises a transition metal beta diketonate or other organometallic compound which thermally decomposes efficiently to form a metal oxide and a transition metal carboxylate which improves the defect control without substantially altering the reactivity of the coating composition or the reflectance and transmittance properties of the pyrolytically deposited metal oxide coating. Preferred organometallic compounds for use according to the present invention are beta diketonates of metal capable of reacting to form metal oxide upon contact with a surface at a temperature of about 900° to 1200° F. (about 482° to 649° C.). The metal is selected from those having an atomic number from 22 to 92, preferably a metal from the first transition series, most preferably cobalt, iron, chromium, copper, manganese, nickel and mixtures thereof. The metal is believed to chelate with the carbonyl oxygens of the beta diketonate to form a compound having the following structure:

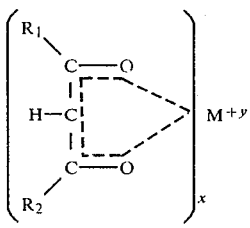

where x is the number of ligands chelated with the transition metal, y is the oxidation state of the metal and x and y are equal.

In the above structure, $R_1$ and $R_2$ may be the same or different. For example, $R_1$ and $R_2$ may be aromatic, such as phenyl, substituted phenyl such as p-methoxy phenyl and p-fluorophenyl, or a fused aromatic structure such as naphthyl. $R_1$ and $R_2$ may be heterocyclic such as 2-thienyl and 2-furyl. Preferably $R_1$ and $R_2$ can be aliphatic, such as lower alkyl, particularly methyl, ethyl, isopropyl and n-propyl, and may be substituted such as trifluoromethyl and hexafluoropropyl. Further, $R_1$ and $R_2$ may be combined in the form of a ring structure, such as 1,3-cyclohexanedione. Specific examples of beta diketonates in accordance with this invention are the following:

2-acetylcyclohexanone
1,3-bis(p-fluorophenyl)-1,3-propanedione
1,3-bis(p-methoxyphenyl)-1,3-propanedione
5,5,-dimethyl-1,3-cyclohexanedione
2,6-dimethyl-3,5-heptanedione
1,3-di(2-naphthyl)-1,3-propanedione
1,5-diphenyl-1,3,5-pentanetrione
1,3-diphenyl-1,3-propanedione
1-(2-furyl)-1,3-butanedione
4,4,5,5,6,6,6-heptafluoro-1-(2-thienyl)-1,3-hexanedione
3,5-heptanedione
1,1,1,5,5,5,-hexafluoro-2,4-pentanedione
2,4-hexanedione
6-methyl-2,4-heptanedione
4,6-nonanedione
2,4-pentanedione
1-phenyl-1,3-butanedione
1-phenyl-2,4-pentanedione
2,2,5,5,-tetramethyl-1,3-cyclohexanedione
1-(2-thienyl)-1,3-butanedione
1,1,1,-trifluoro-3,5-dimethyl-2,4-hexanedione
4,4,4-trifluoro-1-(2-furyl)-1,3-butanedione
1,1,1-trifluoro-2,4-hexanedione
1,1,1-trifluoro-6-methyl-2,4-heptanedione
1,1,1-trifluoro-5-methyl-2,4-hexanedione
4,4,4-trifluoro-1-(2-naphthyl)-1,3-butanedione
1,1,1-trifluoro-2,4-pentanedione
4,4,4-trifluoro-1-phenyl-1,3-butanedione
4,4,4-trifluoro-1-(2-thienyl)-1,3-butanedione.

Preferred beta diketonates are the 1,3-beta diketonates, such as the acetyl acetonates in which $R_1$ and $R_2$ are both methyl. Various other transition metal beta diketonates are described by commercial manufacturers such as Harshaw Chemical Company. Techniques for their preparation are described by Werner in *Berichte,* 34 (1901), pages 2592–2593, by Morgan and Moss, *Journal of the American Chemical Society,* 105 (1914), pages 189–201, and in *Gach Monatshefte,* 21 (1900), page 103.

It is desirable at times to use a mixture of metal beta diketonates, particularly transition metal beta diketonates. In certain instances, it has been found that particular mixtures of beta diketonates produce transparent mixed metal oxide coatings with improved physical and optical properties over those achievable using only one metal beta diketonate. Furthermore, by using various combinations of two or more transition metal beta diketonates, it is possible to get a wide spectrum of pleasing colors in the resultant mixed oxide coatings. For example, the mixture of iron, chromium and cobalt acetyl acetonates gives a resultant transparent mixed metal oxide coating which has greater chemical durability and resistance to surface abrasion than does a comparable metal oxide coating made from any one or two of these particular transition metal acetyl acetonates. Moreover, the combination of iron, chromium and cobalt acetyl acetonates in various proportions gives resultant transparent mixed metal oxide coatings which have a wide variety of pleasing colors. In fact, it has been found that from this particular combination of metal oxides there are as many as 260 distinct colors possible, ranging from browns to greens, as determined by dominant wavelength and excitation purity as derived from tristimulus values that have been adopted by the International Commission on Illumination. An understanding of the determination of color may be obtained by reference to *Handbook of Colorimetry,* prepared by the staff of the Color Measurement Laboratory, Massachusetts Institute of Technology, under the direction of Arthur C. Hardy, printed in 1936 by the Technology Press, Massachusetts Institute of Technology, Cambridge, Mass.

The transition metal carboxylate used according to the present invention to improve the defect control without substantially altering the reactivity of the coating composition or the reflectance and transmittance properties of the pyrolytically deposited metal oxide coating may be a 2-ethyl hexanoate or preferably a neodecanoate of one of the same transition metals present in the beta diketonate coating reactant. For example, if an aesthetically desirable coating comprises cobalt, chromium and iron oxides and can be pyrolytically deposited efficiently utilizing a mixture of cobalt, chromium and iron acetylacetonates, the defect control may be improved according to the present invention by substituting cobalt neodecanoate for cobalt acetylacetonate.

The amount of carboxylate employed in accordance with the present invention may be varied over a wide range, the minimum being determined by an observable improvement in defect control and the maximum being determined by an undesirable alteration in the rate of deposition or the reflectance and transmittance properties of the metal oxide coating. Preferably the amount of transition metal carboxylate is between about 5 and about 40 percent of the total coating reactant, more preferably between about 10 and about 40 percent of the major component of a multiple diketonate coating reactant.

Solvent systems useful in practicing the present invention may include organic solvents well-known in the art such as benzene, toluene, xylene, mesitylene, aliphatic hydrocarbons such as hexane and heptane, and aliphatic alcohols such as methanol and ethanol. However, nonflammable solvents such as halogenated hydrocarbons are preferred. The halogenated hydrocarbon is preferably a compound containing from 1 to 4 carbon atoms, preferably a halogenated hydrocarbon containing 1 or 2 carbon atoms, and more preferably, a halocarbon compound containing 1 or 2 carbon atoms and having at least as many chlorine and/or bromine atoms as carbon atoms. The most preferred halocarbon compounds are methylene chloride and halocarbons containing two carbon atoms and at least as many chlorine as carbon atoms, e.g., perchloroethylene and trichloroethylene.

The halocarbon should constitute at least 20 percent, preferably at least 40 percent, by volume of the total organic solvent system. Examples of the various halocarbons which can be used alone or mixed together include the following: methylene chloride, chloroform, carbon tetrachloride, 1,1,1-trichloroethane, 1,1,2-trichloroethane, 1,1,2,2-tetrachloroethane, 1,1,1,2-tetrachloroethane, pentachloroethane, trichloroethylene, perchloroethylene, 1,2-dichloropropane, 1,3-dichloropropane, hexachloropropane, hexachlorobutadiene, trichloromonofluoromethane, dichloroiodomethane, 1,1,1,2-tetrachloro-2-fluoroethane and 1,1,2-trichloro-1,2-difluoroethane.

As has been mentioned, halocarbons and halocarbon mixtures containing 1 or 2 carbon atoms are preferred because they have greater solvent power for the metal beta diketonate. When 3 or 4 carbon atom halocarbons are employed in the mixtures, the solvent power of the organic solvent decreases. Specific halocarbon mixtures which are most desirable are the following: methylene chloride and at least one other halocarbon compound chosen from perchloroethylene, trichloroethylene and 1,1,1-trichloroethane.

With regard to solubility, it has been found in preparing compositions of this invention that mixtures of halogenated hydrocarbons containing from 1 to 2 carbon atoms and at least as many halogen atoms as carbon atoms exhibit synergistic activity in their combined form towards dissolving certain transition metal beta diketonates. In other words, a specific volume of a mixture of the halogenated hydrocarbons used in the practice of this invention has greater solvating power in dissolving transition metal beta diketonates than does the same volume of a single halogenated hydrocarbon. Therefore, mixtures of halogenated hydrocarbons are preferred solvent systems. Particularly preferred solvent systems are those comprising methylene chloride and a halogenated hydrocarbon containing two carbon atoms and at least as many chlorine atoms, e.g., trichloroethylene, perchloroethylene or trichloroethane. Enhanced solubility of transition metal beta diketonates can be achieved by the inclusion of a polar solvent such as a lower aliphatic alcohol, preferably methanol, in the solvent system. Numerous suitable solvent systems are disclosed in U.S. Pat. No. 4,147,556, which disclosure is incorporated herein by reference.

The solvent system should have dissolved therein at least about 1 percent, preferably 1 to 5 percent, by weight of total metal based on the total weight of the composition. For use in coating glass, higher metal contents, i.e., higher than 10 percent by weight total metal in the composition, are not recommended because the heated substrate has insufficient thermal energy to uniformly convert the organometallic coating reactant to the metal oxide. However, there should be greater than one percent total metal in the coating compositions in order to get the desired reflectance and solar energy absorption to make the glasses useful as solar radiation filters in architectural applications. Further, a low metal content results in rapid cooling of the substrate, which decreases the efficiency of pyrolysis and the film forming rate, leading to the formation of a metal oxide coating having less than optimum thickness. The organometallic coating reactant may simply be added to a desired volume of a particular solvent system with stirring at ambient temperature. When mixed metal beta diketonate solutions are desired, the individual metal beta diketonates can be combined in the desired ratios and then added in the combined form to a particular solvent system. Alternatively, the individual metal diketonates can be dissolved individually in a particular solvent and the solutions combined to form the particularly desired mixture of metal beta diketonates in solution. This latter technique is particularly useful in preparing compositions containing transition metal beta diketonates that are more difficult to dissolve, such as nickel and copper acetylacetonates.

The transition metal carboxylate, according to the present invention, may be added to the solvent system before the diketonate coating reactant is dissolved, added to the coating reactant solution any time prior to use, or dissolved separately and combined with a solution of diketonate.

The coating composition is preferably sprayed, in the form of an atomized mist, onto a hot glass substrate. By spraying, better control is obtained of the evenness of distribution of the coating composition and therefore the uniformity of thickness of the resultant coating than is obtainable by other application techniques. The combination of a carboxylate according to the present invention with the preferred diketonates known in the art of pyrolytic deposition of metal oxide film results in uniform adherence of the coating reactants to the glass surface upon evaporation of the solvent resulting in durability of the metal oxide film. In addition, the carboxylate promotes adherence of coating reactant which does not contact the glass surface to whatever surface it contacts thus reducing defects caused by unused coating reactant particles dropping onto the freshly coated surface.

The present invention will be further understood from the descriptions of specific examples which follow:

EXAMPLE I

A fifty gallon batch of a composition for depositing a mixed metal oxide coating on glass is prepared by dissolving 18.20 kilograms of cobalt acetylacetonate, 6.22 kilograms of cobalt neodecanoate, 5.64 kilograms of iron acetylacetonate and 7.64 kilograms of chromium acetylacetonate in a solvent consisting of 50 percent each by volume of methylene chloride and trichloroethylene. This composition contains 2 percent by weight total metal, and 20 percent by weight of the total cobalt content is in the form of the neodecanoate.

The composition is sprayed onto a glass surface which is at a temperature between about 1000° F. (537° C.) and 1100° F. (593° C.). The organometallic coating reactants decompose to form a durable mixed metal oxide film at the same rate and having the same spectral properties as obtained when the coating reactants are all acetylacetonates.

The improvements obtained by utilizing the carboxylate are best illustrated by the observation that upon evaporating a sample of the above solution, a hard semicrystalline material is formed which has good adherence to both glass and metal surfaces. In contrast, when an equivalent coating composition is prepared except that all the organometallic compounds are acetylacetonates, a loosely adhering powder is formed upon evaporation of the solvent which can cause defects upon contact with the newly formed metal oxide film. These defects may appear as dark spots if the material remains on the coated glass surface or as tiny holes in the coating if the material is subsequently cleaned off taking with it some of the metal oxide coating. Defects greater than about 1/16 inch (about 1.6 millimeters) in diameter may result in the coated glass being rejected for commercial use.

EXAMPLE II

A coating composition is prepared as in Example I except that 30 percent of the cobalt is in the form of neodecanoate. The composition is sprayed onto a hot glass surface and a mixed metal oxide film is formed. Again, the spectral properties are equivalent to those of the film formed from a composition containing all acetylacetonate organometallic coating reactants. More importantly, the coated glass has a defect density (rejectable defects per 100 square feet) of 0.75 after 50 minutes of operation, whereas glass coated with the same metal oxides from a composition comprising only acetylacetonate coating reactants and containing 1 percent cresol has a defect density of 2.19 after only 41 minutes.

EXAMPLE III

A coating composition is prepared as in the previous examples except that 40 percent of the cobalt is in the form of neodecanoate. A mixed metal oxide film is formed with the same spectral properties as in the previous examples. After 65 minutes of operation the defect density of the coated glass is only 0.07 compared with a defect density of 0.28 after 61 minutes of coating with a composition of acetylacetonate coating reactants containing 3 percent cresol.

EXAMPLE IV

A coating composition is prepared with the same metal concentrations and proportions as in the previous examples except that chromium neodecanoate is substituted for chromium acetylacetonate. A mixed metal oxide film is formed with the same spectral properties and similar defect improvement as in the previous examples.

EXAMPLE V

A coating composition is prepared as in the previous examples except that iron neodecanoate is substituted for iron acetylacetonate with similar results, equivalent film forming rate and spectral properties with improved defect control.

EXAMPLE VI

A coating composition is prepared as in Example III except that 40 percent of the cobalt is in the form of 2-ethylhexoate. A mixed metal oxide film is formed having the same spectral properties and similar improvement in defect control.

What is claimed:

1. A composition for the pyrolytic deposition of a durable metal oxide film comprising:
   a. a diketonate of a metal capable of thermal decomposition to the oxide of said metal; and
   b. a neodecanoate of a metal capable of thermal decomposition to the oxide of said metal.

2. The composition according to claim 1 which further comprises a solvent.

3. The composition according to claim 2, wherein the diketonate comprises a metal selected from the group consisting of titanium, vanadium, chromium, manganese, iron, cobalt, silver, indium, tin, antimony and mixtures thereof and the carboxylate comprises a transition metal selected from the group consisting of titanium, vanadium, chromium, manganese, iron, cobalt, nickel, copper and silver.

4. The composition according to claim 3 wherein the diketonate is an acetylacetonate.

5. The composition according to claim 2 wherein the solvent comprises a halocarbon containing from 1 to 4 carbon atoms.

6. The composition according to claim 5 comprising:
   a. an acetylacetonate of a metal selected from the group consisting of cobalt, iron, chromium, copper, manganese, nickel, titanium, vanadium, tin and mixtures thereof;
   b. a neodecanoate of at least one of the selected metals; and
   c. a solvent comprising at least one halocarbon containing as many halogen atoms as carbon atoms.

7. The composition according to claim 6 wherein the amount of neodecanoate is from about 5 to about 40 percent of the total weight of acetylacetonate and neodecanoate.

8. The composition according to claim 7 wherein the selected metal comprises cobalt.

9. The composition according to claim 8 wherein the selected metal further comprises iron.

10. The composition according to claim 9 wherein the selected metal further comprises chromium.

* * * * *